(12) United States Patent
Eiterjord et al.

(10) Patent No.: US 10,629,023 B2
(45) Date of Patent: Apr. 21, 2020

(54) COMPACT MULTI-USER GAMING SYSTEM

(71) Applicant: Tangiamo Touch Technology AB, Göteborg (SE)

(72) Inventors: Jimmy Eiterjord, Västra Frölunda (SE); Mats Nordahl, Trångsund (SE)

(73) Assignee: Tangiamo Touch Technology AB, Göteborg (SE)

( * ) Notice: Subject to any disclaimer, the term of this patent is extended or adjusted under 35 U.S.C. 154(b) by 46 days.

(21) Appl. No.: 16/073,046

(22) PCT Filed: Jan. 19, 2017

(86) PCT No.: PCT/SE2017/050053
§ 371 (c)(1),
(2) Date: Jul. 26, 2018

(87) PCT Pub. No.: WO2017/131572
PCT Pub. Date: Aug. 3, 2017

(65) Prior Publication Data
US 2019/0035204 A1  Jan. 31, 2019

(30) Foreign Application Priority Data
Jan. 30, 2016  (SE) ...................... 1630018

(51) Int. Cl.
*G07F 17/32* (2006.01)
*A63F 5/00* (2006.01)
(Continued)

(52) U.S. Cl.
CPC .............. *G07F 17/322* (2013.01); *A63F 1/12* (2013.01); *A63F 5/0005* (2013.01);
(Continued)

(58) Field of Classification Search
CPC ............ G07F 17/3202; G07F 17/3204; G07F 17/3209; G07F 17/3211; G07F 17/3213; G07F 17/3216; G07F 17/322; G07F 17/3272; G07F 17/3293; G07F 17/34; G07F 17/38; A63F 5/00; A63F 5/0005; A63F 5/0082; A63F 9/0406; A63F 1/12;
(Continued)

(56) References Cited

U.S. PATENT DOCUMENTS

| 4,735,416 A | 4/1988 | McNally | |
|---|---|---|---|
| 2003/0054868 A1* | 3/2003 | Paulsen | ............... G06F 3/04883 463/1 |
| 2005/0239536 A1 | 10/2005 | Ogiwara | |
| 2007/0265057 A1* | 11/2007 | Yoshizawa | .............. G07F 17/32 463/17 |
| 2008/0242390 A1 | 10/2008 | Kido | |

(Continued)

OTHER PUBLICATIONS

International Search Report and Written Opinion for International Application No. PCT/SE2017/050053 dated Apr. 5, 2017, 12 pages.
(Continued)

*Primary Examiner* — Jasson H Yoo
(74) *Attorney, Agent, or Firm* — RMCK Law Group, PLC

(57) ABSTRACT

The present invention generally relates to a compact multi-user gaming system, and specifically to a multi-user gaming system in the form of a gaming table, provided with an integrated automated mechanical gaming machine visibly viewable by the users during a gaming operation. The invention also relates to a corresponding control method and a computer program product.

18 Claims, 4 Drawing Sheets

(51) Int. Cl.
*A63F 9/24* (2006.01)
*G07F 17/34* (2006.01)
*A63F 1/12* (2006.01)
*A63F 9/04* (2006.01)
*G07F 17/38* (2006.01)

(52) U.S. Cl.
CPC .............. *A63F 9/0406* (2013.01); *A63F 9/24* (2013.01); *G07F 17/3209* (2013.01); *G07F 17/3211* (2013.01); *G07F 17/3213* (2013.01); *G07F 17/3272* (2013.01); *G07F 17/3293* (2013.01); *G07F 17/34* (2013.01); *G07F 17/38* (2013.01); *A63F 2009/0408* (2013.01)

(58) Field of Classification Search
CPC ...... A63F 2009/2464; A63F 2009/2458; A63F 2009/241
See application file for complete search history.

(56) References Cited

U.S. PATENT DOCUMENTS

| | | |
|---|---|---|
| 2011/0111866 A1 | 5/2011 | Anthony et al. |
| 2012/0149457 A1 | 6/2012 | Loose et al. |
| 2012/0157183 A1* | 6/2012 | Mead ................... G07F 17/3211 463/20 |
| 2012/0202575 A1 | 8/2012 | Matsuno |
| 2014/0187306 A1 | 7/2014 | Nordahl et al. |
| 2014/0349726 A1 | 11/2014 | Buchholz et al. |
| 2014/0353912 A1 | 12/2014 | Pockaj |

OTHER PUBLICATIONS

Swedish Office Action for SE Application No. 1630018-8 dated Aug. 25, 2016, 5 pages.
Extended European Search Report dated Jul. 3, 2019 for EP Application No. 17744646.5, 9 pages.

* cited by examiner

COMPACT MULTI-USER GAMING SYSTEM

CROSS-REFERENCE TO RELATED APPLICATIONS

This application is a 371 U.S. National Stage of International Application No. PCT/SE2017/050053, filed Jan. 19, 2017, which claims priority to Swedish Application No. 1630018-8, filed on Jan. 30, 2016. The disclosures of each of the above applications are incorporated herein by reference in their entirety.

TECHNICAL FIELD

The present invention generally relates to a compact multi-user gaming system, and specifically to a multi-user gaming system in the form of a gaming table, provided with an integrated automated mechanical gaming machine visibly viewable by the users during a gaming operation. The invention also relates to a corresponding control method and a computer program product.

BACKGROUND OF THE INVENTION

Gaming systems for use in a gaming environment, such as a casino, have a limited maximum number of participants able to play the game simultaneously due to, for example, the size of the specific gaming site or other physical limitations to the gaming system. There is a general desire to allow for more players per each area unit within such a gaming environment.

SUMMARY OF THE INVENTION

According to an aspect of the invention, the above is at least partly alleviated by a gaming system, comprising a transmissive multi-user touch interface comprising at least two defined gaming portions provided for a first and a second user, respectively, a transmissive display screen, and an automated mechanical gaming machine, the automated mechanical gaming machine being a structural device providing a function of a game of chance and having at least a visual front portion, and a control unit connected to the multi-user touch interface, the transmissive display screen and the automated mechanical gaming machine, wherein the gaming system is provided as a gaming table, the multi-user touch interface and the transmissive display screen are adjacently configured above at least the front portion of the automated mechanical gaming machine allowing the users to view at least the front portion of the automated mechanical gaming machine through the transmissive multi-user touch interface and the transmissive display screen, and the control unit is arranged to receive at least an input from a user using the multi-user touch interface and an output from the automated mechanical gaming machine, and to control the transmissive display screen to display, within at least one of the defined gaming portions, a correlation between the user input and the output from the automated mechanical gaming machine.

By means of the invention, an integrated solution may be provided where the automated mechanical gaming machine is arranged "beneath" the user interface and the display, allowing users to have direct visible access to the automated mechanical gaming machine while at the same time moving away from the prior art solution where the automated mechanical gaming machine typically is arranged "on the side" of the gaming table. The presented solution greatly improve, as compared to prior art, the number of players that can play at a single table.

Preferably, the automated mechanical gaming machine may be a roulette wheel comprising a roulette ball. Alternatively, the automated mechanical gaming machine may be a dice-shaking device and comprising at least one dice. The automated mechanical gaming machine may also be an electronic card shuffler comprising a plurality of playing cards. Accordingly, different implementations may be possible in regards to the controllable externally arranged hardware random number generator for providing the random number.

In accordance to the invention, the automated mechanical gaming machine is provided away from the user in such a manner that the automated mechanical gaming machine may not be readily physically manipulated by the users. Thus, an improved safety of the gaming system is provided.

It should be understood that the user interface typically is a single user interface shared between the users (plurality of users). It is advantageous to configure the user interface and the control unit such that the different users may access the user interface simultaneously while being separately identified. In an embodiment the least two defined gaming portions are expected to be solely operated by the separate users.

Preferably, the information presented at the display screen and the input expected at the user interface may be updated, for example allowing different types of games to be played using the same type of automated mechanical gaming machine. In regards to the automated mechanical gaming machine being a dice-shaking device, it may for example be possible to adjust the information presented to be switched between e.g. the dice game Craps, "Sic Bo" (also sometimes referred to as "Cussec", "Tai Sai", "Dai Siu", "Big and Small" or "Hi-Lo"), Fish-Prawn-Crab/Hoo Hey How, Grand Hazard/Chuck-a-Luck/Birdcage, etc. The same of course counts for an implementation where the automated mechanical gaming machine is a roulette wheel. Also, it could be possible to adapt the gaming system such that the type of automated mechanical gaming machine may be exchanged, e.g. between different types of roulette wheels (e.g. single or double zero), etc.

The expression "control unit" should be understood to include any type of computing device, such as an ASIC, a micro-processor, etc. It should also be understood that the actual implementation of such a processing circuitry may be divided between more than a single device/circuit.

Further features of, and advantages with, the present invention will become apparent when studying the appended claims and the following description. The skilled addressee realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawing, in which.

DETAILED DESCRIPTION

Figure 1:
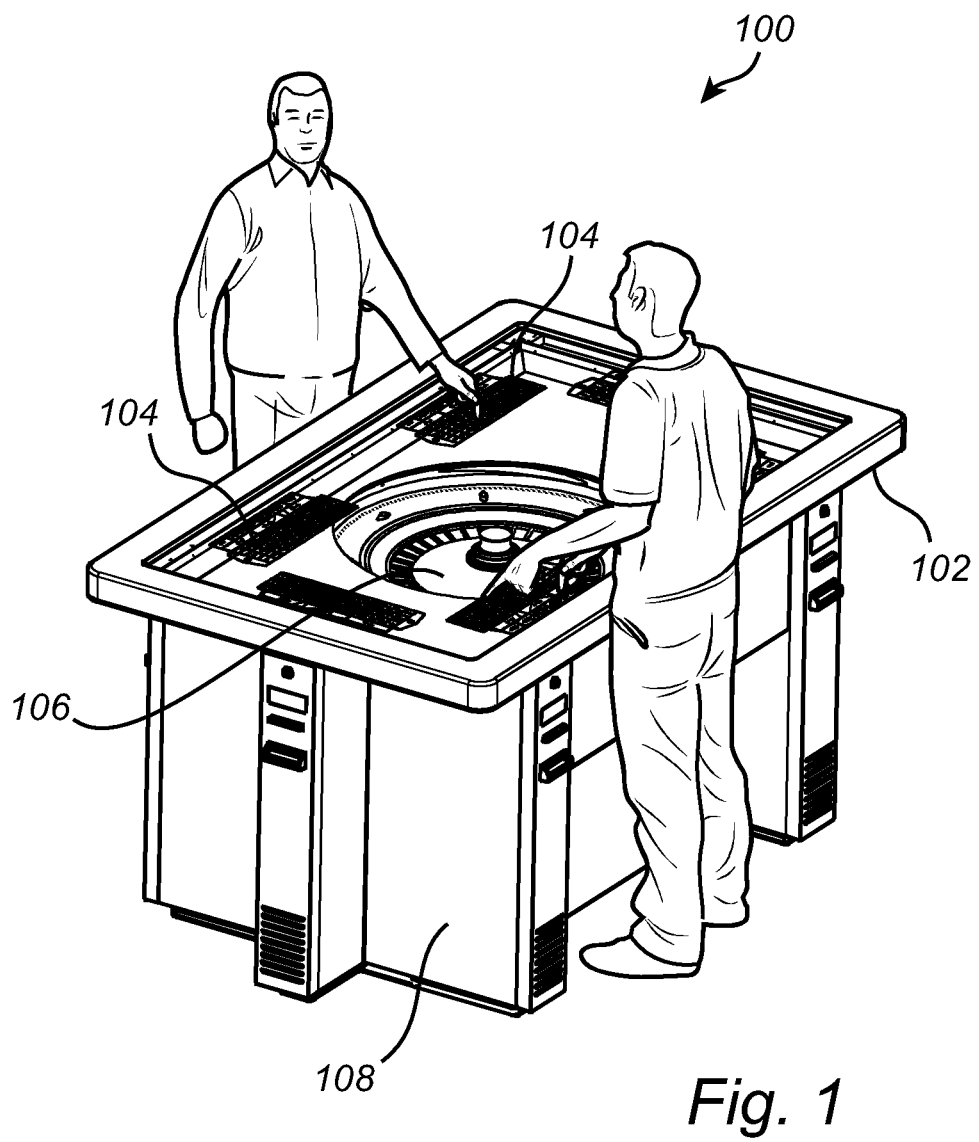
FIG. 1 illustrates a perspective view of a gaming system according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Referring now to the drawings and to FIG. 1 in particular, there is depicted a gaming system, in the form of a gaming table 100 including a multi-user touch interface and display 102 for a plurality of users/players sharing the same user interface. The display may for example be a dynamically configurable display, such as an LCD panel, connected to a control unit (not shown) for handling bets provided by the players. Furthermore, the multi-user touch interface and display 102 comprises a plurality of gaming portions 104. In the illustrated embodiment, the multi-user touch interface and display 102 comprise six relatively evenly distributed gaming portions 104 which hence allow six users/players to simultaneously play on the gaming table 100. The gaming table 100 may of course comprise a multi-user touch interface and display 102 having more than six gaming portions 104, or less than six gaming portions. Further details with regards to the gaming portions 104 will be given below in relation to the description of FIG. 2.

Moreover, the gaming table 100 comprises an automated mechanical gaming machine 106 arranged at a position vertically below the multi-user touch interface and display 102, in an enclosed cavity formed beneath the multi-user touch interface and display 104. Thus, a user is able to visually monitor the automated mechanical gaming machine 106 when standing next to the gaming table 100. The automated mechanical gaming machine 106 is in the illustrated example embodiment in FIG. 1 a physical roulette wheel where the ball will be automatically provided in a spinning motion around the circular track running around the circumference of the roulette wheel. Possibly, the automated roulette wheel 106 uses air pressure to launch the ball onto the brim and a series of optical and proximity sensors to track the ball during its path and detect its final position. The tracking information and the final position are communicated to the control unit.

Other automated mechanical gaming machines are of course conceivable such as e.g. a dice gaming machine for playing the so-called dice game "Sic Bo" as will be described below in relation to the description of FIG. 3*b*.

Although the automated mechanical gaming machine 106 can be visually monitored by the users, there are situations which will be described further below, when it is desirable to prevent a user to visually monitor the automated mechanical gaming machine 106. In these situations, the multi-user touch interface and display 102 may be arranged in an opaque mode, or lighting thereof may be arranged to prevent user(s) from temporarily visually monitoring the automated mechanical gaming machine 106. Preferably, a plurality of controllable light sources are connected to and controlled by means of the control unit, where a mode (fully active to non-active) may be allowed to dependent on a state of the game presented by the gaming system.

Furthermore, the gaming table 100 comprises a plurality of side panels 108 arranged on side portions of the gaming table 100. Hereby, the vertical long sides and vertical short sides comprise the side panels 108 for preventing the users to gain physical access to the automated mechanical gaming machine 106. This improves the safety of the gaming system since it is not possible for a user to manipulate with the automated mechanical gaming machine 106. Also, the gaming table 100 comprises user terminals 110 at the side panels in the vicinity of the respective gaming portions 104. The user terminals allow the user to buy markers or cash out acquired money/markers.

Figure 2:
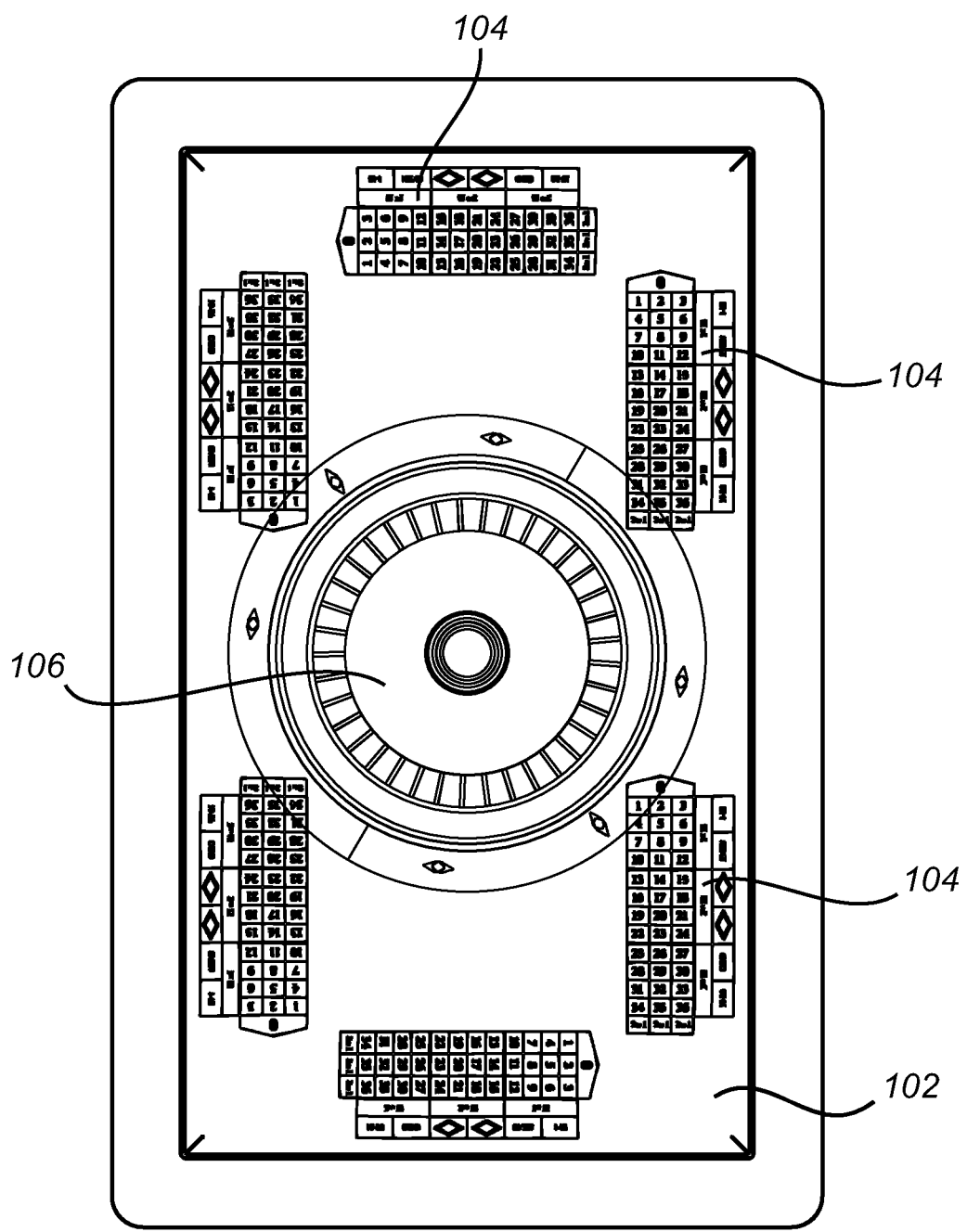
FIG. 2 provides detailed information relating to the gaming portions provided for user interaction.

FIG. 2 provides detailed information relating to the gaming portions 104 provided for user interaction. Specifically, six gaming portions 104 are displayed by means of the multi-user touch interface and display 102. In the illustrated embodiment the gaming portions 106 are arranged to correspond to the "normal" set-up of for a roulette game, in this case one roulette-game-set-up is provided to each of the users/players. In accordance to the invention, it is desirable to arrange the gaming portions 104 such that interaction by a first user is not obscuring the possibility for a second user to view the automated mechanical gaming machine 106. It should be understood that the gaming portions 104 be allowed to e.g. change position/size during the time frame of a game, e.g. one position/size at the time of placement of a bet, and one position/size when an outcome of a game is presented.

For allowing the different players to place bets, the multi-user touch interface and display 102 may comprise identification means (not shown) for differentiate the different users from each other. Such identification means may comprise a multitude of sensors, and the results captured by the sensor may in turn be correlated for determining the identity of the user. Other types of technology may also be provided, where the control unit and combination with the user interface are configured to allow differentiation between different users.

Figure 3A:
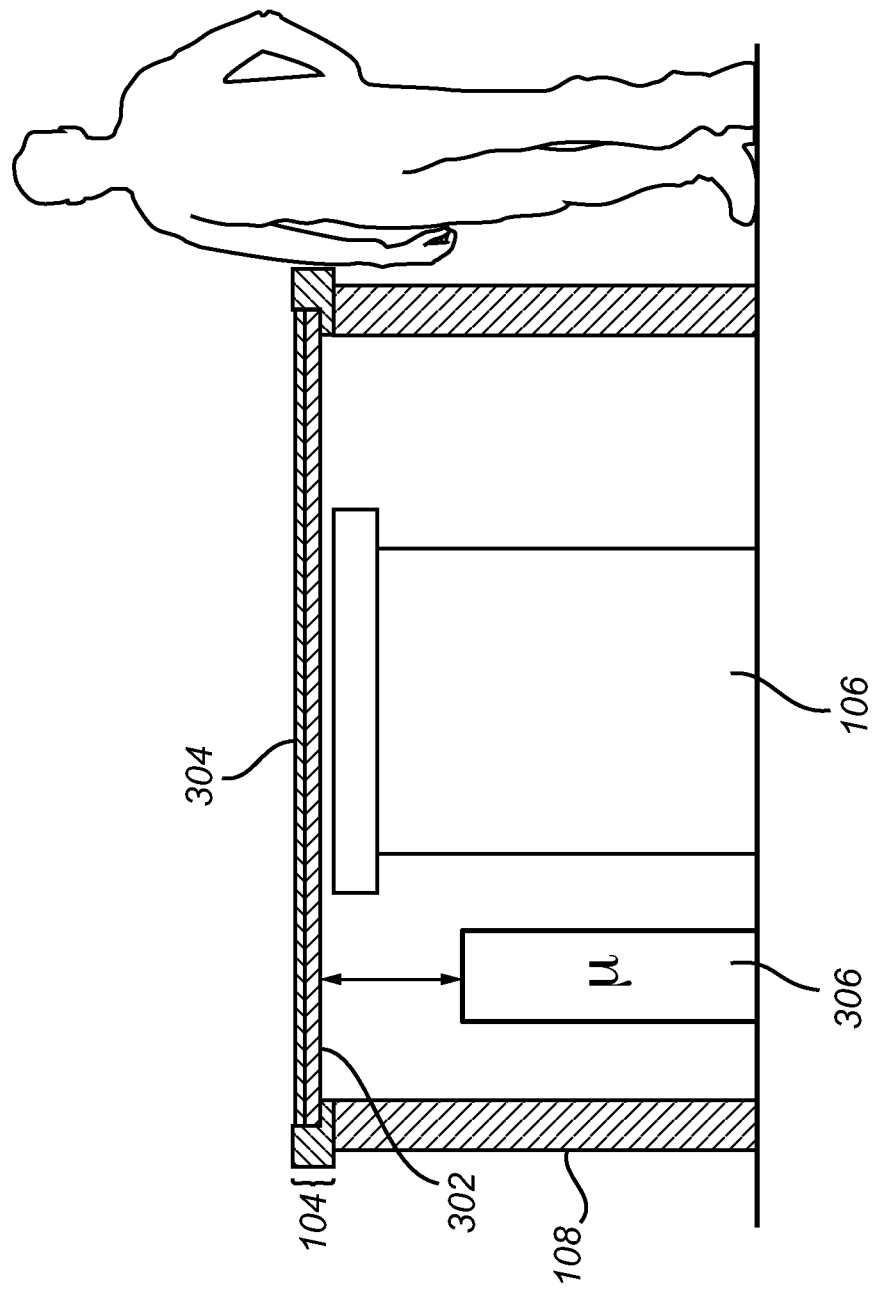
FIG. 3*a* is a side view of gaming system, comprising an automated mechanical gaming machine in the form of a roulette wheel.

In FIG. 3*a* there is provided a side view of gaming system, comprising the roulette wheel 106. In the illustrated embodiment it is shown that the roulette wheel is arranged directly underneath the multi-user touch interface and display 102. The multi-user touch interface and display 102 is in this embodiment shown as two separate parts, i.e. display 302 and user interface 304. As seen from the top, the user interface 304 is arranged top most, the display 302 in between, and the roulette wheel 106 arranged below the display 302.

FIG. 3*a* further presents the control unit 306, arranged in communication with the roulette wheel 106, the display 302 and user interface 304. The control unit 306 may each include a microprocessor, microcontroller, programmable digital signal processor or another programmable device. The control unit 306 may also, or instead, each include an application specific integrated circuit, a programmable gate array or programmable array logic, a programmable logic device, or a digital signal processor. Where the control unit 306 includes a programmable device such as the microprocessor, microcontroller or programmable digital signal processor mentioned above, the processor may further include computer executable code that controls operation of the programmable device.

Figure 3B:
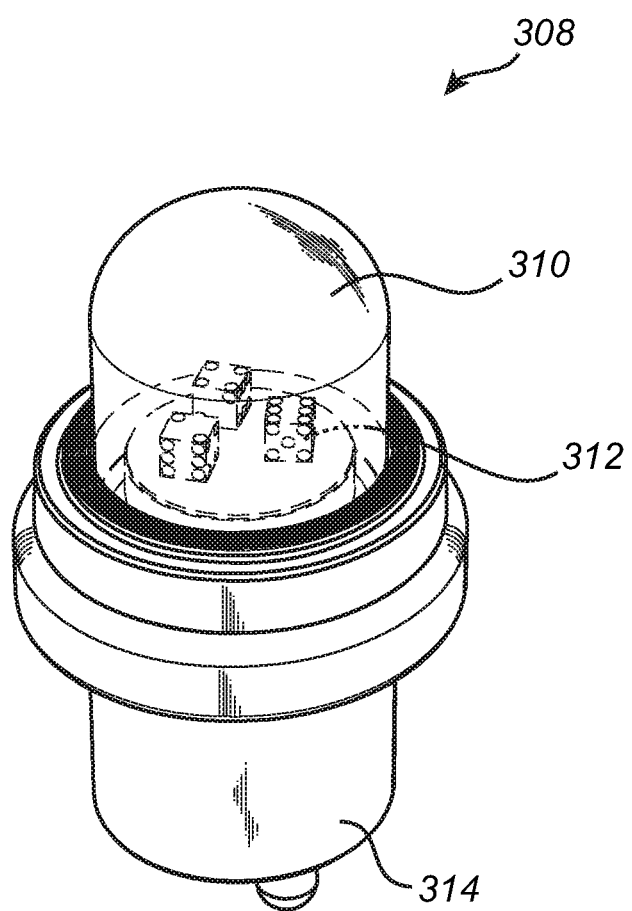
FIG. 3*b* provides an alternative automated mechanical gaming machine in the form of a dice-shaking device.

In FIG. 3*b* there is provided an alternative automated mechanical gaming machine in the form of a dice-shaking device 308, to be arranged in the enclosed cavity formed beneath the multi-user touch interface and display 102. The dice-shaking device 308 comprises a transparent cover 310 covering a plurality of dice 312, internally arranged means in the dice-shaking device 308 for shaking the dice 312. The means for shaking the dice 312 may for example include a mechanically wobbling surface, arranged in a housing 314, that in turn shakes the dice 312. The time of shaking of the dice 312 may for example be controlled by means of the gaming control unit 306.

For automatic determination of the outcome once the time for shaking the dice 312 has ended, a symbol recognition arrangement (not shown) is provide. The symbol recognition arrangement comprises an image capturing device connected to the control unit 306. The image capturing device may be a camera, for example comprising a CCD or a CMOS sensor. Additionally, for providing illumination that may be used by the image capturing device in capturing an image, the symbol recognition arrangement may be provided with one or a plurality of light sources, such as a plurality of LEDs. The LEDs may emit light within a visible wavelength, but may also, or instead, emit light within with an infrared wavelength. Accordingly, the image capturing device may be provided with a filter for only allowing light within a specific, corresponding, wavelength range to be allowed to reach the capturing means of the image capturing device.

In addition, the control functionality of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art. Further, a single unit may perform the functions of several means recited in the claims. In the claims, any reference signs placed between parentheses shall not be construed as limiting to the claim. Furthermore, in the claims, the word "comprising" does not exclude other elements or steps, and the indefinite article "a" or "an" does not exclude a plurality.

Variations to the disclosed embodiments can be understood and effected by the skilled addressee in practicing the claimed invention, from a study of the drawings, the disclosure, and the appended claims. The person skilled in the art realizes that the present invention is not limited to the preferred embodiments.

The invention claimed is:

1. A gaming system, comprising:
a transmissive multi-user touch interface comprising at least two defined gaming portions provided for a first and a second user, respectively;
a transmissive display screen;
an automated mechanical gaming machine, the automated mechanical gaming machine being a structural device providing a function of a game of chance and having at least a visual front portion; and
a control unit connected to the multi-user touch interface, the transmissive display screen and the automated mechanical gaming machine,
wherein:
the gaming system is provided as a gaming table,
the multi-user touch interface and the transmissive display screen are adjacently configured above at least the front portion of the automated mechanical gaming machine allowing the users to view at least the front portion of the automated mechanical gaming machine through the transmissive multi-user touch interface and the transmissive display screen,
the control unit is arranged to receive at least an input from a user using the multi-user touch interface and an output from the automated mechanical gaming machine, and to control the transmissive display screen to display, within at least one of the defined gaming portions, a correlation between the user input and the output from the automated mechanical gaming machine,
the automated mechanical gaming machine is a roulette wheel comprising a roulette ball,
the control unit is configured to overlay a virtual roulette wheel at the display screen at a position corresponding to the physical roulette wheel viewable through the transmissive multi-user touch interface and the transmissive display screen, and
the multi-user touch interface allows for user input at the virtual roulette wheel.

2. The gaming system according to claim 1, wherein the multi-user touch interface and the transmissive display screen are adjacently arranged horizontally above at least the front portion of the automated mechanical gaming machine.

3. The gaming system according to claim 1, wherein the automated mechanical gaming machine spans a defined volume and the defined volume is completely integrated underneath the gaming table.

4. The gaming system according to claim 1, wherein the automated mechanical gaming machine is secured underneath the gaming table, not allowing users physical access to the automated mechanical gaming machine.

5. The gaming system according to claim 1, wherein the transmissive multi-user touch interface and the transmissive display screen are combined as one single unit.

6. The gaming system according to claim 1, wherein the transmissive multi-user touch interface applies capacitive technology for user input.

7. The gaming system according to claim 1, further comprising a plurality of controllable light sources, connected to and controlled by means of the control unit.

8. The gaming system according to claim 7, wherein the plurality of light sources controlled between a fully active and a non-active mode dependent on a state of the game presented by the gaming system.

9. A gaming system, comprising:
   a transmissive multi-user touch interface comprising at least two defined gaming portions provided for a first and a second user, respectively;
   a transmissive display screen;
   an automated mechanical gaming machine, the automated mechanical gaming machine being a structural device providing a function of a game of chance and having at least a visual front portion; and
   a control unit connected to the multi-user touch interface, the transmissive display screen and the automated mechanical gaming machine,
   wherein:
      the gaming system is provided as a gaming table,
      the multi-user touch interface and the transmissive display screen are adjacently configured above at least the front portion of the automated mechanical gaming machine allowing the users to view at least the front portion of the automated mechanical gaming machine through the transmissive multi-user touch interface and the transmissive display screen,
      the control unit is arranged to receive at least an input from a user using the multi-user touch interface and an output from the automated mechanical gaming machine, and to control the transmissive display screen to display, within at least one of the defined gaming portions, a correlation between the user input and the output from the automated mechanical gaming machine, and
      the automated mechanical gaming machine is a dice-shaking device.

10. The gaming system according to claim 9, wherein the transmissive multi-user touch interface and the transmissive display screen are combined as one single unit.

11. The gaming system according to claim 9, wherein the transmissive multi-user touch interface applies capacitive technology for user input.

12. The gaming system according to claim 9, further comprising a plurality of controllable light sources, connected to and controlled by means of the control unit.

13. The gaming system according to claim 12, wherein the plurality of light sources controlled between a fully active and a non-active mode dependent on a state of the game presented by the gaming system.

14. A gaming system, comprising:
   a transmissive multi-user touch interface comprising at least two defined gaming portions provided for a first and a second user, respectively;
   a transmissive display screen;
   an automated mechanical gaming machine, the automated mechanical gaming machine being a structural device providing a function of a game of chance and having at least a visual front portion; and
   a control unit connected to the multi-user touch interface, the transmissive display screen and the automated mechanical gaming machine,
   wherein:
      the gaming system is provided as a gaming table,
      the multi-user touch interface and the transmissive display screen are adjacently configured above at least the front portion of the automated mechanical gaming machine allowing the users to view at least the front portion of the automated mechanical gaming machine through the transmissive multi-user touch interface and the transmissive display screen,
      the control unit is arranged to receive at least an input from a user using the multi-user touch interface and an output from the automated mechanical gaming machine, and to control the transmissive display screen to display, within at least one of the defined gaming portions, a correlation between the user input and the output from the automated mechanical gaming machine, and
      the automated mechanical gaming machine is an electronic card shuffler comprising a plurality of playing cards.

15. The gaming system according to claim 14, wherein the transmissive multi-user touch interface and the transmissive display screen are combined as one single unit.

16. The gaming system according to claim 14, wherein the transmissive multi-user touch interface applies capacitive technology for user input.

17. The gaming system according to claim 14, further comprising a plurality of controllable light sources, connected to and controlled by means of the control unit.

18. The gaming system according to claim 17, wherein the plurality of light sources controlled between a fully active and a non-active mode dependent on a state of the game presented by the gaming system.

* * * * *